: US007376192B2

(12) United States Patent
Koorapaty et al.

(10) Patent No.: US 7,376,192 B2
(45) Date of Patent: May 20, 2008

(54) DELTA MODULATION FOR CHANNEL FEEDBACK IN TRANSMIT DIVERSITY WIRELESS COMMUNICATION SYSTEMS

(75) Inventors: Havish Koorapaty, Cary, NC (US); Rajaram Ramesh, Cary, NC (US); Leonid Krasny, Cary, NC (US)

(73) Assignee: Telefonaktiebolaget L M Ericsson (PUBL), Stockholm (SE)

( * ) Notice: Subject to any disclaimer, the term of this patent is extended or adjusted under 35 U.S.C. 154(b) by 671 days.

(21) Appl. No.: 10/897,250

(22) Filed: Jul. 22, 2004

(65) Prior Publication Data

US 2006/0018389 A1    Jan. 26, 2006

(51) Int. Cl.
*H04L 27/00* (2006.01)
(52) U.S. Cl. .................. 375/259; 375/296; 375/346
(58) Field of Classification Search ................ 375/219, 375/232, 296, 346–348
See application file for complete search history.

(56) References Cited

U.S. PATENT DOCUMENTS

| | | | | |
|---|---|---|---|---|
| 3,699,566 | A | * | 10/1972 | Schindler ..................... 341/143 |
| 3,806,806 | A | * | 4/1974 | Brolin ......................... 375/249 |
| 4,071,825 | A | * | 1/1978 | McGuffin .................... 375/248 |
| 4,109,203 | A | * | 8/1978 | Eggermont et al. .......... 375/249 |
| 4,385,393 | A | * | 5/1983 | Chaure et al. ............... 375/249 |
| 5,727,023 | A | * | 3/1998 | Dent ........................... 375/244 |
| 6,700,923 | B1 | * | 3/2004 | Dowling et al. ............. 375/148 |
| 2001/0004390 | A1 | * | 6/2001 | Pukkila et al. .............. 375/340 |
| 2002/0042279 | A1 | * | 4/2002 | Da Rocha et al. .......... 455/456 |

(Continued)

FOREIGN PATENT DOCUMENTS

WO    PCT/SE03/002039    12/2003

(Continued)

OTHER PUBLICATIONS

Roh et al ("An Efficient Feedback Method for MIMO Systems with Slowly Time-Varying Channels", Wireless Communications and Networking Conference, 2004. WCNC. 2004 IEEE, Mar. 21-25, 2004, vol. 2 pp. 760-764).*

(Continued)

*Primary Examiner*—David C. Payne
*Assistant Examiner*—Leon-Viet Q Nguyen
(74) *Attorney, Agent, or Firm*—Roger S. Burleigh

(57) ABSTRACT

A method is described herein for reducing the number of feedback bits needed to send channel state information over a feedback channel from a receiving unit (e.g., mobile terminal, base station) to a transmitter unit (e.g., base station, mobile terminal) in a wireless communication system. In the embodiment, the receiver unit is capable of performing the following steps: (1) receiving a pilot signal from a transmit antenna located at a transmitter unit; (2) analyzing a channel tap associated with the transmit antenna and exploiting the temporal correlations of the channel tap to generate the following (i) a delta-modulated feedback bit indicative of a real part of a complex coefficient of the channel tap associated with the transmit antenna and (ii) a delta-modulated feedback bit indicative of an imaginary part of the complex coefficient of the channel tap associated with the transmit antenna; and (3) sending the two feedback bits over a feedback channel to the transmitter unit which analyzes the two feedback bits, and other feedback bits corresponding to other channel taps of this and other transmit antennas, to optimize the subsequent transmission of data to the receiver unit.

27 Claims, 3 Drawing Sheets

U.S. PATENT DOCUMENTS

| | | | |
|---|---|---|---|
| 2002/0105961 A1* | 8/2002 | Hottinen et al. | 370/442 |
| 2003/0017835 A1* | 1/2003 | Bergel | 455/502 |
| 2003/0043892 A1* | 3/2003 | Braun | 375/148 |
| 2003/0109225 A1* | 6/2003 | Aldajani et al. | 455/69 |
| 2003/0147476 A1* | 8/2003 | Ma et al. | 375/329 |

FOREIGN PATENT DOCUMENTS

WO     WO 2005060190 A1     6/2005

OTHER PUBLICATIONS

N. S. Jayant ("Digital Coding of Speech Waveforms: PCM, DPCM and DM quantizers", published in the U.S. Journal "Proceedings of IEEE," May 1974).*

N.S. Jayant—Peter Noll; Digital Coding of Waveforms Principles and Applications to Speech and Video; Prentice-Hall Signal Processing Series; Alan V. Oppenheim, Series Editor; pp. 372-375.

* cited by examiner

DELTA MODULATION FOR CHANNEL FEEDBACK IN TRANSMIT DIVERSITY WIRELESS COMMUNICATION SYSTEMS

BACKGROUND OF THE INVENTION

1. Field of the Invention

The present invention relates in general to a method for feeding back detailed channel information from a mobile terminal (e.g., mobile phone, mobile station) to a base station in a wireless communication system.

2. Description of Related Art

In a frequency division duplex communication system, i.e., where the downlink signals (base station to mobile terminal) and uplink signals (mobile terminal to base station) are sent on different frequencies, the base station does not know information about the downlink channel since it does not receive any downlink signals. However, the base station could benefit from knowing this downlink information (e.g., amplitude and phase information for some or all of the channel taps of the communication channels) that is measured by the mobile terminal. In particular, the base station can use this channel information to adapt (e.g., power, frequency, modulation scheme, coding) data signals that are subsequently transmitted to the mobile phone. In this way, the base station can maximize the throughput to the mobile terminal. Accordingly, the capacity of the wireless communication system can be significantly increased by using a feedback channel to convey the detailed channel information from the mobile terminal to the base station. However, the quantity of channel information that needs to be fed back to the base station can take up too much bandwidth on the feedback channel between the mobile terminal and base station.

Today, the problem of feeding back such a large amount of detailed channel information can be solved by using a zero-memory quantization method. In the zero-memory quantization method, the real and imaginary parts of each channel coefficient of a channel tap of the channel are quantized to N levels and represented by $[\log_2(N)]$ bits. Unfortunately, this method still consumes a large amount of bandwidth on the feedback channel. For example in a three-tap channel, the quantizing of real and imaginary parts to 16 levels requires sending $[\log_2(16)] \times 2 \times 3 = 24$ bits per time unit.

Another way of solving the problem of feeding back such a large amount of detailed channel information is described in PCT Patent Application Ser. No. PCT/SE03/02039 filed on Dec. 19, 2003 and entitled "Adaptive Channel Measurement Reporting". The contents of this PCT Patent Application are hereby incorporated herein. Essentially, the PCT Patent Application describes various methods of compressing channel measurement reports, feeding back full or incremental reports and methods for varying the accuracy and periodicity of these reports based on the speed of the mobile terminal, the bandwidth and the complexity of the channel. The preferred compression method discussed includes sending only the channel state information for the strongest channel taps to the base station. Although this method generally works well to reduce the load on the feedback channel it still can use too much bandwidth. Accordingly, there is a need for a new method for reducing the number of bits that the mobile terminal needs to send channel information to the base station. This need and other needs are satisfied by the method of the present invention.

BRIEF DESCRIPTION OF THE INVENTION

The present invention includes a method for reducing the number of feedback bits needed to send channel state information over a feedback channel from a mobile terminal to a base station in a wireless communication system. In one embodiment, the mobile terminal receives a pilot signal from one of the transmit antennas located at the base station. The mobile terminal then computes a channel estimate $\hat{c}(n)$ of a real part of a complex coefficient of a channel tap associated with the channel between the transmit and receive antennas on which the pilot signal was received. The mobile terminal also generates a reconstructed channel estimate $e(n)$ of the real part of the complex coefficient of the channel tap associated with the channel corresponding to the pilot signal using feedback bits that were sent in the past to the base station. The mobile terminal then determines a difference between the channel estimate $\hat{c}(n)$ and the reconstructed channel estimate $e(n)$ and quantizes that difference into two levels so as to generate a +1 feedback bit $b(n)$ if the difference is a positive number or to generate a −1 feedback bit $b(n)$ if the difference is a negative number. The mobile terminal sends the feedback bit $b(n)$ over a feedback channel to the base station. In addition, the mobile terminal performs these computing, generating, determining and quantizing steps to generate a feedback bit $b(n)$ for an imaginary part of the complex coefficient of the channel tap associated with the channel corresponding to the pilot signal. This feedback bit $b(n)$ is also sent to the base station. Such feedback bits may be sent for all channel taps of the channel or for some subset of the channel taps. The base station then analyzes the two feedback bits $b(n)$, for each channel tap for which bits were sent, to optimize the subsequent transmission of data to the mobile terminal. It should be appreciated that this method could be used in reverse so that the base station could send feedback information to the mobile terminal.

BRIEF DESCRIPTION OF THE DRAWINGS

A more complete understanding of the present invention may be had by reference to the following detailed description when taken in conjunction with the accompanying drawings wherein.

DETAILED DESCRIPTION OF THE DRAWINGS

Figure 1:
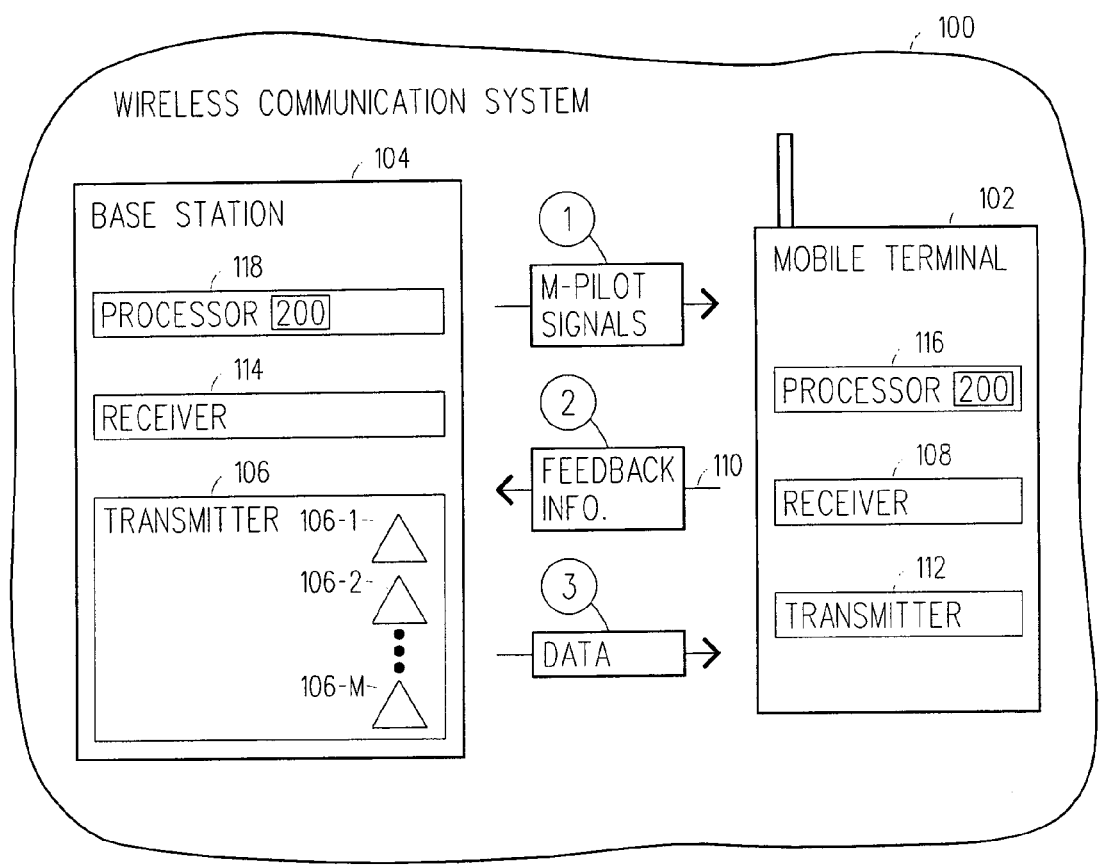
FIG. 1 is a block diagram of a wireless communications network that includes a base station and a mobile terminal both of which implement a delta-modulation method in accordance with the present invention.
Figure 2:
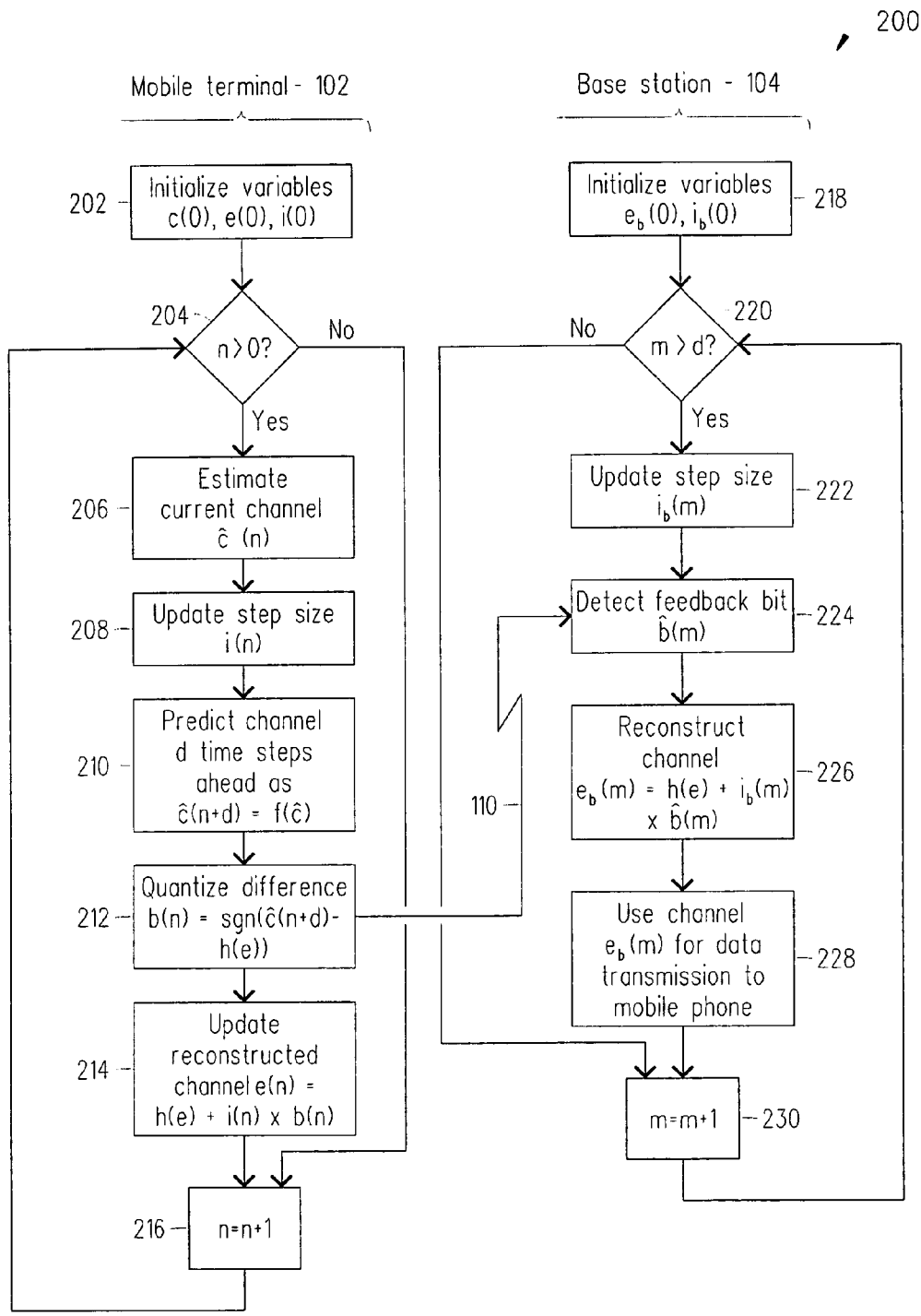
FIG. 2 is a flowchart illustrating the steps of the preferred delta-modulation method for reducing the number of feedback bits needed to send channel state information over a feedback channel from the mobile terminal to the base station shown in FIG. 1 in accordance with the present invention.
Figure 3:
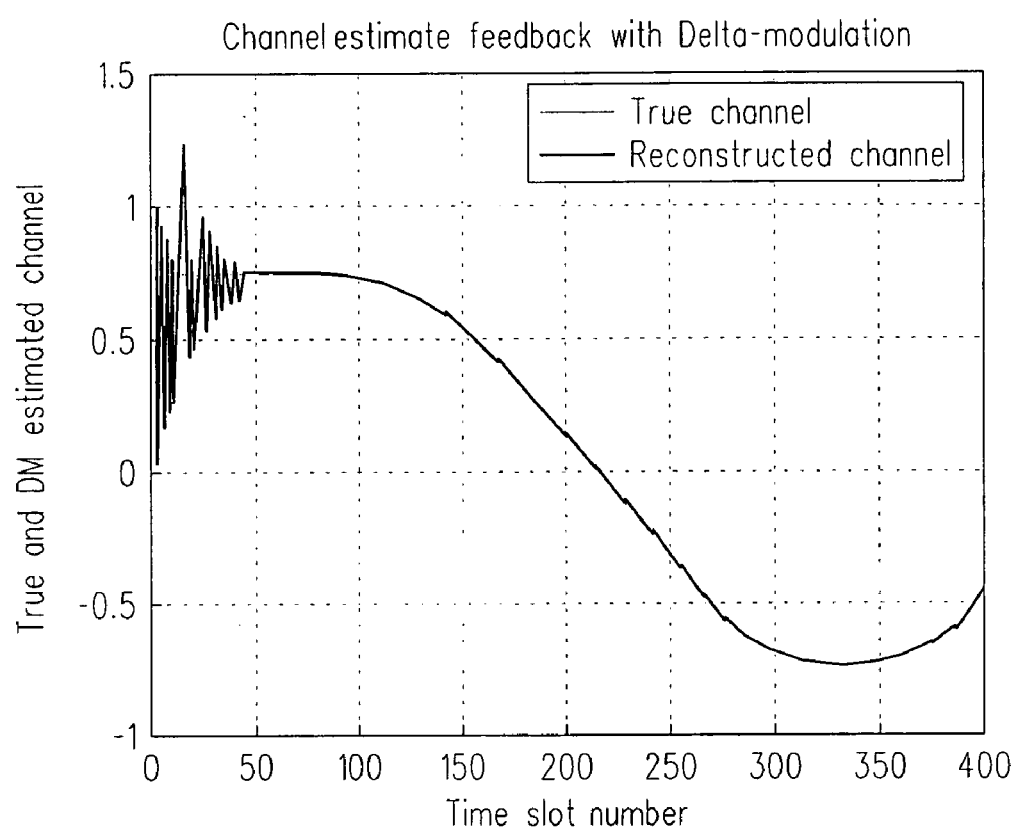
FIG. 3 is a graph that shows the difference between a reconstructed channel at a base station and a true channel for the first few time slots before the delta-modulation method shown in FIG. 2 locks onto the true channel.

Referring to FIGS. 1-3, there are disclosed a preferred embodiment of a wireless communication system 100 and a preferred method 200 for reducing the number of feedback bits needed to send channel state information from a mobile terminal 102 to a base station 104 within the wireless communication system 100 in accordance with the present invention. Although the preferred method 200 is described below in the context where the mobile terminal 102 sends feedback information to the base station 104, it should be appreciated that the method 200 could be used in reverse where the base station 104 sends feedback information to the mobile terminal 102. Accordingly, the wireless communication system 100 and preferred method 200 should not be construed in such a limited manner.

Referring to FIG. 1, there is shown a block diagram of the wireless communications network 100 that includes a mobile terminal 102 (only one shown) and base station 104 (only one shown) both of which implement the delta-modulation method 200 of the present invention. It should be appreciated that certain details and components associated with the mobile terminal 102 and the base station 104 are well known in the industry. Therefore, for clarity, the description provided below in relation to the mobile terminal 102 and the base station 104 omits the well known components and details that are not necessary to understand the present invention.

As shown, the base station 104 transmits a pilot signal $p_i(t)$, $i \in \{1,M\}$ from each antenna 106-1, 106-2 ... 106-M (see box labeled "1") to a receiver 108 within the mobile terminal 102 equipped with a single antenna. The pilot signals $p_i(t)$ are known apriori at a processor 116 in the mobile terminal 102. In addition, the pilot signals $p_i(t)$ have low cross-correlation properties and enable the processor 116 to estimate the channels $c_i(t)$ corresponding to each of the transmit antennas 106-1, 106-2 ... 106-M in the base station 104. The mobile terminal 102 and in particular the transmitter 112 subsequently sends partial or full channel state information (see box labeled "2") over a feedback channel 110 to a transmitter 106 in the base station 104. The bandwidth available on the feedback channel 110 may vary. A processor 118 in the base station 104 then analyzes this channel state information before sending data $d_i(t)$ (see box labeled "3") to the mobile terminal 102. In one embodiment, the processor 118 uses the received channel state information to optimize the transmitted signal $d_i(t)$ so that the signal-to-noise ratio at the mobile terminal 102 is maximized. This is achieved by using the channel state information to pre-filter the signal $d_i(t)$ transmitted on each antenna 106-1, 106-2 ... 106-M, effectively matching the pre-filter to the expected channel between each antenna 106-1, 106-2 ... 106-M and the mobile terminal 102.

The present invention addresses the problem of sending channel state information on the feedback channel 110 efficiently from the mobile terminal 102 to the base station 104. To achieve this, the delta-modulation method 200 is used to encode the differences between channel state information from one time unit to the next. The time unit of interest in most cellular systems 100 is referred to as a slot. For example, in a Wideband Code Division Multiple Access (WCDMA) system which is one embodiment of the wireless communication system 100, a slot has a duration of 0.66 ms.

The channel estimated at the mobile terminal 102, for each transmit antenna 106-1, 106-2 ... 106-M, can be characterized by a set of channel taps with complex coefficients and certain time delays with respect to a synchronization point. It suffices in most situations to have the channel delays spaced in multiples of one symbol or chip period. The delta-modulation method 200 described below transmits two bits of feedback for each channel tap, one bit representing the real part and the other the imaginary part of the channel coefficient. In one embodiment, it is assumed that synchronization has already been achieved between the mobile terminal 102 and the base station 104 and hence only relative delay information for the taps with respect to this synchronization point may need to be feedback to the base station 104. However, this delay information may be reduced or completely avoided if some or all of the delays are assumed to be on a fixed grid with respect to the initial synchronization point.

A preferred embodiment of the delta-modulation method 200 that can be followed at the mobile terminal 102 and the base station 104 is shown in FIG. 2. The steps followed at the mobile terminal 102 are explained in the context of feeding back information regarding the real part of a channel coefficient for a channel tap. It should be noted the same procedure applies for the imaginary part as well. The steps of method 200 are as follows:

A. Initialize variables (step 202): The mobile terminal 102 and in particular the processor 116 initializes the following variables all of which are described in greater detail below:

$c(0)$ is the estimate of current channel based on received pilot signal.

$e(0)$ is the reconstructed channel.

$i(0)$ is the step size.

n is the time index.

B. Check time index (step 204): Is the time index n>0? If yes then go to step 206. And, if no then go to step 216

C. Estimate current channel $\hat{c}(n)$ (step 206): The mobile terminal 102 and in particular the processor 116 computes the channel estimate $\hat{c}(n)$ of the real part of the complex channel coefficient.

D. Adapt step size (step 208): The mobile terminal 102 and in particular the processor 116 adapts the step size $i(n)$ for the current time step based on previous feedback/delta-modulated bits. The step size $i(n)$ determines the weight accorded to the current delta-modulated feedback bit $b(n)$ in reconstructing the channel estimate (see step 214). The step size $i(n)$ could be adapted in many different ways. One possible embodiment is the following. A window of 2·N delta-modulated bits ($b(n-2N)$, $b(n-2N+1)$, ..., $b(n-1)$) from the past are inspected where $N \geq 1$. If all the bits are either +1 or −1, the step size $i(n)$ is increased. If on the other hand there are equal number of +1 and −1 bits in the window, the step size $i(n)$ is decreased. A possible technique for increasing and reducing the step size $i(n)$ can be represented as follows:

$$i(n) = i(n-1) \cdot A, \left| \sum_{k=n-1}^{n-2N} b(k) \right| = 2N \quad (1)$$

$$i(n) = i(n-1)/A, \left| \sum_{k=n-1}^{n-2N} b(k) \right| = 0$$

where $A \geq 1$. It should be noted that this is only one embodiment for adapting the step size $i(n)$. Other embodiments such as additive adaptation are also considered within the scope of the present invention. Further, upper and lower limits on the step size may be placed so that the step size is always constrained to be within these limits.

E. Predict channel to compensate feedback delay (step 210): The mobile terminal 102 and in particular the processor 116 can use channel estimates $\hat{c}(j)$ where $j \leq n$ until the current time step n to predict $\hat{c}(n+d)$, i.e., the channel d time steps ahead. This may be necessary to compensate for a d time unit delay in the feedback bit $b(n)$ computed at the mobile terminal 102 being used for reconstructing the channel $e_b(m)$ at the base station 104. The prediction can be represented as:

$$\hat{c}(n+d) = f(\hat{c}) \quad (2)$$

where $f(\cdot)$ is some function of the previous channel estimates. The simplest predictor is to use $\hat{c}(n+d) = \hat{c}(n)$. This suffices for low delays and low mobile speeds. As the delay increases and/or the speed of the mobile terminal 102 increases, it is desirable to have better prediction algorithms incorporated into the procedure. For example, a Wiener filter may be used that is based on the estimated correlation matrix of the estimate waveform.

F. Generate and transmit delta information (step 212): The mobile terminal 102 and in particular the processor 116 quantizes the difference between the estimated channel $\hat{c}(n+d)$ and the predicted channel $h(e)$ into two levels. This can be achieved as:

$$b(n) = sgn(\hat{c}(n+d) - h(e)) \quad (3)$$

where $h(\cdot)$ is a function of the previous reconstructed channel estimates $e = [e(n-1), e(n-2), \ldots, e(1)]$ and "sgn" represents a function that is −1 if the argument is negative and +1 if the argument is positive. The function $h(\cdot)$ predicts the channel e one time unit ahead based on past reconstructed channel values. The simplest predictor once again is $h(e) = e(n-1)$ where $e(n-1)$ is the reconstructed estimate of $\hat{c}(n+d-1)$ obtained at the previous time step from previously transmitted feedback bits. Another predictor that is useful when transmitted feedback bits may be subject to errors is $h(e) = q \cdot e(n-1)$, where $q < 1$. The computed bit $b(n)$ is now transmitted to the base station 104.

G. Update reconstructed channel at mobile terminal 102 (step 214): The mobile terminal 102 and in particular the processor 116 updates the reconstructed channel $e(n)$ at the current time step as follows:

$$e(n) = h(e) + i(n) \cdot b(n) \quad (4)$$

where $i(n)$ is computed in step 208 and $b(n)$ is computed at step 212 for the current time step.

H. Increment time index n (step 216): Increment the time index $n = n+1$ and return to step 204.

The base station 104 performs the following steps:

A. Initialize variables (step 218): The base station 104 and in particular the processor 118 initializes the following variables:
$e_b(0)$ is the reconstructed channel.
$i_b(0)$ is the step size.
m is the time index.

B. Check time index (step 220): Is the time index $m > d$? If yes then go to step 222. And, if no then go to step 230.

C. Adapt step size (step 222): The base station 104 and in particular the processor 118 adapts the step size $i_b(m)$ for the current time step in the same manner as was done in the mobile terminal 102 at step 208. As such, the base station's step size $i_b(m)$ should equal the mobile terminal's step size $i(n)$ if there are no errors in transmission of the feedback bits. It should be appreciated that the mobile terminal 102 may periodically send $i(n)$ along with the $b(n)$ to the base station 104 during step 212.

D. Detect feedback bit $\hat{b}(m)$ (step 224): The base station 104 receives and detects the transmitted feedback bit $b(n)$ from the mobile terminal (see step 212). The detected bit may have errors depending on the quality of the channel so it is denoted by $\hat{b}(m)$.

E. Reconstruct channel $e_b(m)$ (step 226): The base station 104 and in particular the processor 118 uses the detected feedback bit $\hat{b}(m)$ to reconstruct the channel at the current time step as:

$$e_b(m) = h(e_b) + i_b(m) \cdot \hat{b}(m) \quad (5)$$

where $i_b(m)$ is the step size used at the base station 104 (see step 222) and $\hat{b}(m)$ is the detected feedback bit at the base station 104 and $e_b = [e(n-1), e(n-2), \ldots, e(1)]$. Again, the detected bits $\hat{b}(m)$ could potentially have some errors in them depending on the quality of the feedback channel.

F. Use reconstructed channel $e_b(m)$ to transmit data $d_i(t)$ to the mobile terminal 102 (step 228): The base station 104 and in particular the processor 118 uses the channel estimate $e_b(m)$ to maximize throughput to the mobile terminal 102.

G. Increment time index m (step 230): Increment the time index $m = m+1$ and return to step 220.

Again, the process shown in FIG. 2 is completed for the real part and the imaginary part for each channel tap for the channel associated with each base station antenna transmitting pilot signal $p_i(t)$. Of course, the process shown in FIG. 2 can be performed for the real part and/or imaginary part of selected channel taps (not all of the channel taps) to further reduce the bandwidth on the feedback channel 110. It should be appreciated that the ordering of the basic steps of the above procedure may be altered with minor adjustments and still achieve the same results. The above procedure therefore is only one representative embodiment of the ideas described herein.

The method 200 can be described in yet another way where the mobile terminal 102 and in particular the receiver 108 receives (see box labeled "1" in FIG. 1) a pilot signal $p_i(t)$ from one of the transmit antennas 106-1, 106-2 ... 106-M located within in the base station 104. Then the mobile terminal 102 computes (step 206) a channel estimate $\hat{c}(n)$ of a real part of a complex coefficient of a channel tap for a channel corresponding to a transmitted pilot signal. The mobile terminal 102 also generates a reconstructed channel estimate $e(n)$ of the real part of the complex coefficient of the channel tap associated with the channel corresponding to the pilot signal using feedback bits that were sent in the past to the base station 104. The mobile terminal 102 determines (step 212) a difference between the channel estimate $c(n)$ and the reconstructed channel estimate $e(n)$ and quantizes (step 212) that difference into two levels so as to generate (step 212) a +1 feedback bit $b(n)$ if the difference is a positive number or generate a −1 feedback bit $b(n)$ if the difference is a negative number. The mobile terminal 102 sends the feedback bit $b(n)$ (see box labeled "2" in FIG. 1) over the feedback channel 110 to the base station 104. In addition, the mobile terminal 102 performs these computing, generating, determining and quantizing steps to generate a feedback bit $b(n)$ for an imaginary part of the complex coefficient of the channel tap associated with the channel corresponding to the pilot signal. This feedback bit $b(n)$ is also sent to the base station 104 (see box labeled "2" in FIG. 1). Feedback bits corresponding to some or all of the channel taps are sent in this manner. The base station then analyzes (steps 226 and 228) these feedback bits $b(n)$ to optimize the subsequent transmission of data (see box labeled "3" in FIG. 1) to the mobile terminal 102. It should be noted that the mobile terminal 102 can compensate for a feedback delay by estimating (step 210) a channel estimate $\hat{c}(n+d)$ for d time steps ahead and using the $\hat{c}(n+d)$ instead of $\hat{c}(n)$ in the aforementioned determining and quantizing step (step 212). It should also be noted that the mobile terminal 102 can adapt (step 208) the step size i(n) for a current time step based on previous feedback bits where the adapt step size i(n) indicates a weight to be accorded to the current feedback bit b(n) when reconstructing the channel estimate e(n)(step 214).

It should be further noted that the method 200 described above is only one embodiment of the present invention. Other embodiments of the present invention include moving the prediction step 210 that is shown performed by the mobile terminal 102 to the base station 104. In this case, the base station 104 performs the prediction step based on its reconstructed waveform of the channel $e_b(m)$. Other embodiments include combining the predictions characterized by the functions f(ĉ) and h(e) into one step. In this case, the formulation of the delta-modulation method 200 at the mobile terminal 102 then involves skipping step 210 and modifying steps 212 and 214 as follows:

$$b(n)=sgn(\hat{c}(n)-h'(e')) \quad (6)$$

$$e(n)=h'(e')+i(n)\cdot b(n) \quad (7)$$

where e'=[e(n−d), . . . ,e(1)] and e(n) is computed at the base station 104.

Additional embodiments of method 200 are described in detail below:

Initial synchronization: FIG. 3 is a graph which shows that the base station 104 can take a few slots at the start of the communication session to lock on to the channel with the mobile terminal 102. For data communication systems with very short session times, this may be undesirable. In order to circumvent this, a more complete channel estimate such as the traditional TDRF (8 bits per tap) scheme that needs more feedback bits can be sent initially at session establishment. And then subsequently, the method 200 can be implemented and 2 delta-modulated bits per tap can be sent from the mobile terminal 102 to update the channel estimate at the base station 104.

Resynchronization: When bit transmission errors or frame losses occur on the feedback channel 110, the mobile terminal 102 and the base station 104 can lose synchronization. This can be detected at the base station 104 by checking for inordinately long runs of +1 or −1 received delta-modulated feedback bits b(n). When this happens, the base station 104 can prompt the mobile terminal 102 to perform the initial synchronization technique again and then after this restart the delta-modulation method 200. Alternatively, frame errors at the mobile terminal 102, indicated by error detection codes, can be used to alert the mobile terminal 102 that the base station 104 is using wrong reconstructed channel estimates for pre-filtering its transmissions to the mobile terminal 102. The mobile terminal 102 can then send more detailed channel information, as in the initial synchronization procedure, to resynchronize proceedings with the base station 104.

Periodic full channel feedback: Periodically, more complete information about the channel along with a time-stamp and with delay information if needed can be sent from the mobile terminal 102 to the base station 104. This is different than the previous resynchronization embodiment since the base station 104 in this embodiment does not prompt or initiate this process, nor is it initiated by the mobile terminal 102 based on any detection of frame errors. It should be appreciated that the mobile terminal 102 can send the more complete channel information in this embodiment or the previous two embodiments using control or acknowledgement messages at the higher layers.

From the foregoing, it can be readily appreciated by those skilled in the art that the present invention provides a receiver unit (e.g., mobile terminal) capable of performing the following steps: (1) receiving a pilot signal from a transmit antenna located within in a transmitter unit; (2) analyzing a channel tap associated with the transmit antenna and exploiting the temporal correlations of the channel tap to generate the following (i) a delta-modulated feedback bit indicative of a real part of a complex coefficient of the channel tap associated with the pilot signal and (ii) a delta-modulated feedback bit indicative of an imaginary part of the complex coefficient of the channel tap associated with the pilot signal; and (3) sending the two feedback bits over a feedback channel to the transmitter unit which analyzes the two feedback bits and other similarly transmitted feedback bits, corresponding to other channel taps of the same transmit antenna and other transmit antennas, to optimize the subsequent transmission of data to the receiver unit.

Following are some additional features, advantages and uses of the present invention:

The method 200 enables a receiver unit (e.g., mobile terminal, base station) to send detailed information back to a transmitter unit (e.g., base station, mobile terminal) while sending a very low quantity of information in each time unit, i.e., utilizing low feed back bandwidth. This is done by exploiting the temporal correlation of the channel.

The method 200 improves the performance of the wireless communications system 100 for a given reverse link bandwidth by making the encoding of channel feedback information more efficient.

Although the preferred method 200 was described above in the context of a wireless communication system 100 that had transmit antenna diversity at the base station 104, it should be understood that the preferred method 200 could be used to feedback detailed channel information between any two nodes in any communication system.

As described above, the traditional solutions consume higher bandwidth on the feedback channel to achieve the same level of performance as compared to the solution presented in method 200. In particular, for a three-tap channel, quantizing the real and imaginary parts to 16 levels requires, sending {$\log_2(16)$]×2×3=24 bits per time unit. The solution described in method 200 requires feeding back only 6 bits per time unit with no loss, and perhaps a gain in performance. The reason for the higher bandwidth requirement with traditional solutions is that they don't exploit the temporal correlation of the channel taps, i.e., the fact that the channel values from one time unit to the next are not completely independent, as is done in method 200.

Even though the wireless communications network is described herein as being a third generation cellular system, it should be appreciated that the wireless communications network could implement other standards besides the third generation standard.

Although several embodiments of the present invention has been illustrated in the accompanying Drawings and described in the foregoing Detailed Description, it should be understood that the invention is not limited to the embodiments disclosed, but is capable of numerous rearrangements, modifications and substitutions without departing from the spirit of the invention as set forth and defined by the following claims.

What is claimed is:

1. A receiver unit comprising:
   a receiver for receiving a pilot signal from a transmit antenna located at a transmitter unit; and
   a processor for performing the following steps:
   computing a channel estimate of a real part of a complex coefficient of a channel tap associated with a channel corresponding to the transmit antenna:
   generating a reconstructed channel estimate of the real part of the complex coefficient of the channel tap associated with the channel corresponding
   to the transmit antenna using feedback bits that were sent in the past to the transmitter unit;
   determining a difference between the channel estimate and the reconstructed channel estimate;
   quantizing the difference between the channel estimate and the reconstructed channel estimate to generate a feedback bit to be sent to the transmitter unit;
   said processor also performing the computing, generating, determining and quantizing steps to generate a feedback bits for an imaginary part of the complex coefficient of the channel tap associated with the channel of the pilot signal;
   a transmitter for sending the two feedback bits corresponding to a channel tap over a feedback channel to the transmitter unit which uses the feedback bits to optimize the subsequent transmission of data to the receiver;
   wherein said processor uses more than two feedback bits per channel tap to send a more complete channel estimate to the transmitter unit 1) during an initial synchronization between the receiver and the transmitter unit; 2) when said transmitter unit requests a resynchronization between the receiver and the transmitter unit; 3) when said processor decides to send the more complete channel estimate to said transmitter unit; or 4) at periodic intervals.

2. The receiver unit of claim 1, wherein said processor for both the real part and the imaginary part of the channel tap compensates for a feedback delay by performing a step of predicting a future channel estimate based on current and past estimates and uses this predicted channel in the determining and quantizing steps.

3. The receiver unit of claim 1, wherein said processor for both the real part and the imaginary part of the channel tap performs a step of adapting a step size for a current time step based on previous feedback bits wherein the adapted step size indicates a weight to be accorded to the latest feedback bit when generating the reconstructed channel estimate.

4. The receiver unit of claim 3, wherein said transmitter periodically sends the step sizes in addition to the two feedback bits per channel tap to the transmitter unit.

5. The receiver unit of claim 1, wherein said receiver unit is a mobile terminal and said transmitter unit is a base station.

6. The receiver unit of claim 1, wherein said receiver unit is a base station and said transmitter unit is a mobile terminal.

7. A transmitter unit comprising:
   a transmit antenna for transmitting a pilot signal to a receiver unit;
   a receiver for receiving two feedback bits sent by said receiver unit; and,
   a processor for analyzing the two received feedback bits b(n) for each channel tap corresponding to the transmit antenna to generate reconstructed channel estimates for both the real parts and the imaginary parts of the complex coefficients of the channel taps and for using the reconstructed channel estimates to optimize the subsequent transmission of data to the receiver unit from that transmit antenna;
   wherein the receiver for receiving feedback bits receives more than two feedback bits per channel tap representing a more complete channel estimate 1) during an initial synchronization between said transmitter unit and the receiver unit; 2) during periodic resynchronization between said transmitter unit and the receiver unit; or 3) when said receiver unit decides to send the more complete channel estimate to said transmitter unit.

8. The transmitter unit of claim 7, wherein:
   said processor, for both the real part and the imaginary part of a channel tap, performs a step of adapting a step size for a current time step based on previous feedback bits received from the receiver unit wherein the adapted step size indicates a weight to be accorded to the latest feedback bit when reconstructing the channel estimate.

9. The transmitter unit of claim 8, wherein the receiver for receiving feedback bits periodically receives step sizes from the receiver unit in addition to the two feedback bits per channel tap.

10. The transmitter unit of claim 7, wherein said transmitter unit is a mobile terminal and said receiver unit is a base station.

11. The transmitter unit of claim 7, wherein said transmitter unit is a base station and said receiver unit is a mobile terminal.

12. A wireless communication system comprising:
   a receiver unit that receives a pilot signal corresponding to a transmit antenna and performs for both a real part and imaginary part of a complex coefficient of a channel tap associated with the transmit antenna the following steps:
   computing a channel estimate;
   compensating for a feedback delay by computing a predicted channel estimated time steps ahead;
   generating a reconstructed channel estimate based on a latest feedback bit sent to the transmitter unit, past reconstructed channel estimates and on the step size;
   adapting the step size based on previous feedback bits;
   generating a feedback bit by quantizing the difference between the predicted channel estimate and a function of the current and past reconstructed channel estimates into two levels;
   transmitting the feedback bit to the transmitter unit;
   a transmitter unit for transmitting a pilot signal corresponding to each transmit antenna at the transmitter unit that performs the following steps;
   receiving the feedback bits transmitted by said receiver unit;
   adapting the step size for a current time step based on previous feedback bits;
   reconstructing a channel estimate based on the latest feedback bit received from the receiver unit, past reconstructed channel estimates and on the step size; and
   utilizing the reconstructed channel estimate to maximize throughput to said receiver unit;
   wherein said receiver unit uses more than two feedback bits per channel tap to send a more complete channel estimate to the transmitter unit 1) when said transmitter unit requests a resynchronization between said receiver unit and said transmitter unit; 2) during an initial synchronization between said receiver unit and said transmitter unit; or 3) at periodic times to resynchronize said receiver unit and said transmitter unit.

13. The wireless communications system of claim 12, wherein the step size is adapted as follows:
   the step size is increased by multiplying with a constant greater than 1 when a fixed number of past feedback bits all have the same value;
   the step size is decreased by multiplying with a constant greater less than 1 when the sum of a fixed number of past feedback bits is zero;
   the step size is restricted to lie within an upper and a lower limit; and
   the upper and lower limits may also be adjusted based on the rate of variation of the channel estimates.

14. The wireless communications system of claim 12, wherein the predicted channel estimate is computed using a Wiener filter.

15. The wireless communications system of claim 12, wherein said receiver unit periodically sends the step size in addition to the feedback bit to the transmitter unit.

16. The wireless communications system of claim 12, wherein said receiver unit uses more than two feedback bits per channel to send a more complete channel estimate to the transmitter unit.

17. The wireless communications system of claim 12, wherein said transmitter unit has multiple transmit antennas.

18. The wireless communications system of claim 12, wherein said transmitter unit is a mobile terminal and said receiver unit is a base station.

19. The wireless communications system of claim 12, wherein said transmitter unit is a base station and said receiver unit is a mobile terminal.

20. A method for feeding back detailed channel information from a receiver unit to a transmitter unit in a wireless communications network, said method comprising the steps of:
   transmitting, from a transmit antenna at a transmitter unit, a pilot signal;
   receiving, at the receiver unit, the pilot signal corresponding to the transmit antenna and performing for both a real part and imaginary part of a complex coefficient of a channel tap associated with the transmit antenna the following steps:
   computing a channel estimate;
   compensating for a feedback delay by computing a predicted channel estimate d time steps ahead;
   generating a reconstructed channel estimate based on a latest feedback bit sent to the transmitter unit, past reconstructed channel estimates and on the step size;
   adapting the step size based on previous feedback bits;
   generating a feedback bit by quantizing the difference between the predicted channel estimate and a function of the current and past reconstructed channel estimates into two levels;
   transmitting the feedback bit b(n) to the transmitter unit;
   receiving at the transmitter unit the feedback bit b(n) and performing the following steps:
   adapting step size for a current time step based on previous feedback bits;
   reconstructing a channel estimate based on the latest feedback bit received from the receiver unit, past reconstructed channel estimates and on the step size; and
   utilizing the reconstructed channel estimate to maximize throughput to said receiver unit;
   wherein said receiver unit uses more than two feedback bits per channel tap to send a more complete channel estimate to the transmitter unit 1) when said transmitter unit requests a resynchronization between said receiver unit and said transmitter unit; 2) during an initial synchronization between said receiver unit and said transmitter unit; or 3) at periodic times to resynchronize said receiver unit and said transmitter unit.

21. The method of claim 20, wherein the step size is adapted as follows:
   the step size is increased by multiplying with a constant greater than 1 when a fixed number of past feedback bits all have the same value;
   the step size is decreased by multiplying with a constant greater less than 1 when the sum of a fixed number of past feedback bits is zero;
   the step size is restricted to lie within an upper and a lower limit; and
   the upper and lower limits may also be adjusted based on the rate of variation of the channel estimates.

22. The method of claim 20, wherein the predicted channel estimate is computed using a Wiener filter.

23. The method of claim 20, wherein said receiver unit periodically sends the step size in addition to the feedback bit to the transmitter unit.

24. The method of claim 20, wherein said receiver unit uses more than two feedback bits per channel tap to send a more complete channel estimate to the transmitter unit.

25. The method of claim 20, wherein said transmitter unit has multiple transmit antennas.

26. The method of claim 20, wherein said transmitter unit is a mobile terminal and said receiver unit is a base station.

27. The method of claim 20, wherein said transmitter unit is a base station and said receiver unit is a mobile terminal.

* * * * *

UNITED STATES PATENT AND TRADEMARK OFFICE
CERTIFICATE OF CORRECTION

PATENT NO. : 7,376,192 B2
APPLICATION NO. : 10/897250
DATED : May 20, 2008
INVENTOR(S) : Koorapaty et al.

It is certified that error appears in the above-identified patent and that said Letters Patent is hereby corrected as shown below:

In Column 10, Line 1, in Claim 7, after "analyzing the" delete "two".

In Column 11, Line 13, in Claim 13, delete "greater" before "less".

In Column 11, Line 50, in Claim 20, delete "estimate d" and insert -- estimated --, therefor.

In Column 12, Line 32, in Claim 21, delete "greater" before "less".

Signed and Sealed this

Thirtieth Day of December, 2008

JON W. DUDAS
*Director of the United States Patent and Trademark Office*